United States Patent
Motohashi

(10) Patent No.: US 6,275,715 B1
(45) Date of Patent: Aug. 14, 2001

(54) TRANSMISSION POWER RESTRICTION

(75) Inventor: Teruyuki Motohashi, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/048,234

(22) Filed: Mar. 26, 1998

(30) Foreign Application Priority Data

Mar. 27, 1997 (JP) .................................... 9-075216

(51) Int. Cl.[7] .................................... H04M 1/00
(52) U.S. Cl. .................... 455/574; 455/127; 455/556; 455/343
(58) Field of Search .................... 455/556, 557, 455/574, 127, 126, 114, 115, 296, 310, 66, 67.1, 78, 84, 38.3, 343, 572; 370/311

(56) References Cited

U.S. PATENT DOCUMENTS

| | | |
|---|---|---|
| 4,509,201 | 4/1985 | Sekigawa et al. . |
| 5,142,699 * | 8/1992 | Sato et al. ............................ 455/343 |
| 5,471,663 * | 11/1995 | Davis .................................... 455/296 |
| 5,778,026 * | 7/1998 | Zak ....................................... 455/127 |
| 5,790,957 * | 8/1998 | Heidari ................................ 455/572 |
| 5,920,592 * | 7/1999 | Tanaka et al. ....................... 455/343 |
| 5,970,419 * | 10/1999 | Terashima et al. .................. 455/343 |

FOREIGN PATENT DOCUMENTS

| | | |
|---|---|---|
| 2 298 499 | 9/1996 | (GB) . |
| 2 313 741 | 12/1997 | (GB) . |
| 3-23725 | 1/1991 | (JP) . |
| 7-273721 | 10/1995 | (JP) . |

* cited by examiner

Primary Examiner—Lester G. Kincaid
(74) Attorney, Agent, or Firm—Young & Thompson

(57) ABSTRACT

In a mobile information apparatus including a data processing section and a radio communication section, it is checked whether the radio communication section performs radio transmission and, when the radio communication section performs the radio transmission, power consumption of the data processing section is restricted within a predetermined level lower than a normal level. Therefore, the total power consumption of the mobile information apparatus is also restricted within a power consumption level lower than the sum of maximum power consumption thereof.

19 Claims, 4 Drawing Sheets

FIG. 2A
COMM. OPERATION OF RADIO SECTION
| R | T | R | T | R | T |
FIG. 2B
| H/L | L | H/L | L | H/L | L |
OPERATION OF DATA PROCESSING SECTION
FIG. 2C
CURRENT DRAIN OF RADIO SECTION
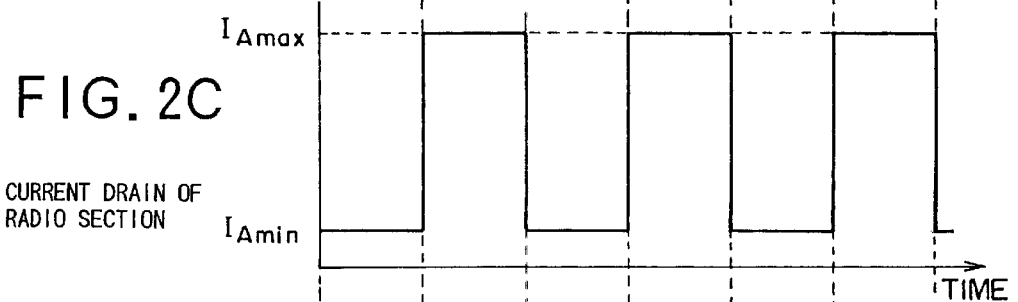
FIG. 2D
CURRENT DRAIN OF DATA PROCESSING SECTION
FIG. 2E
TOTAL CURRENT DRAIN
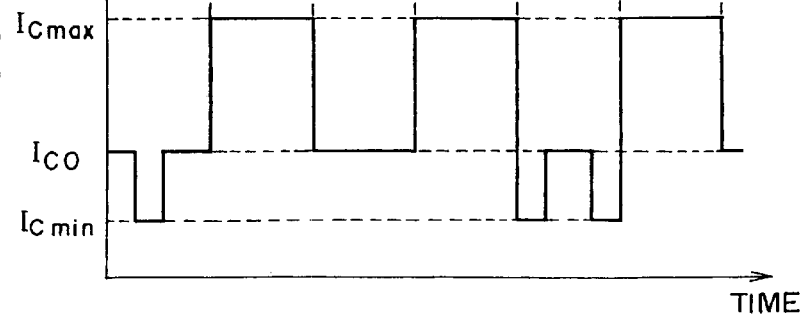

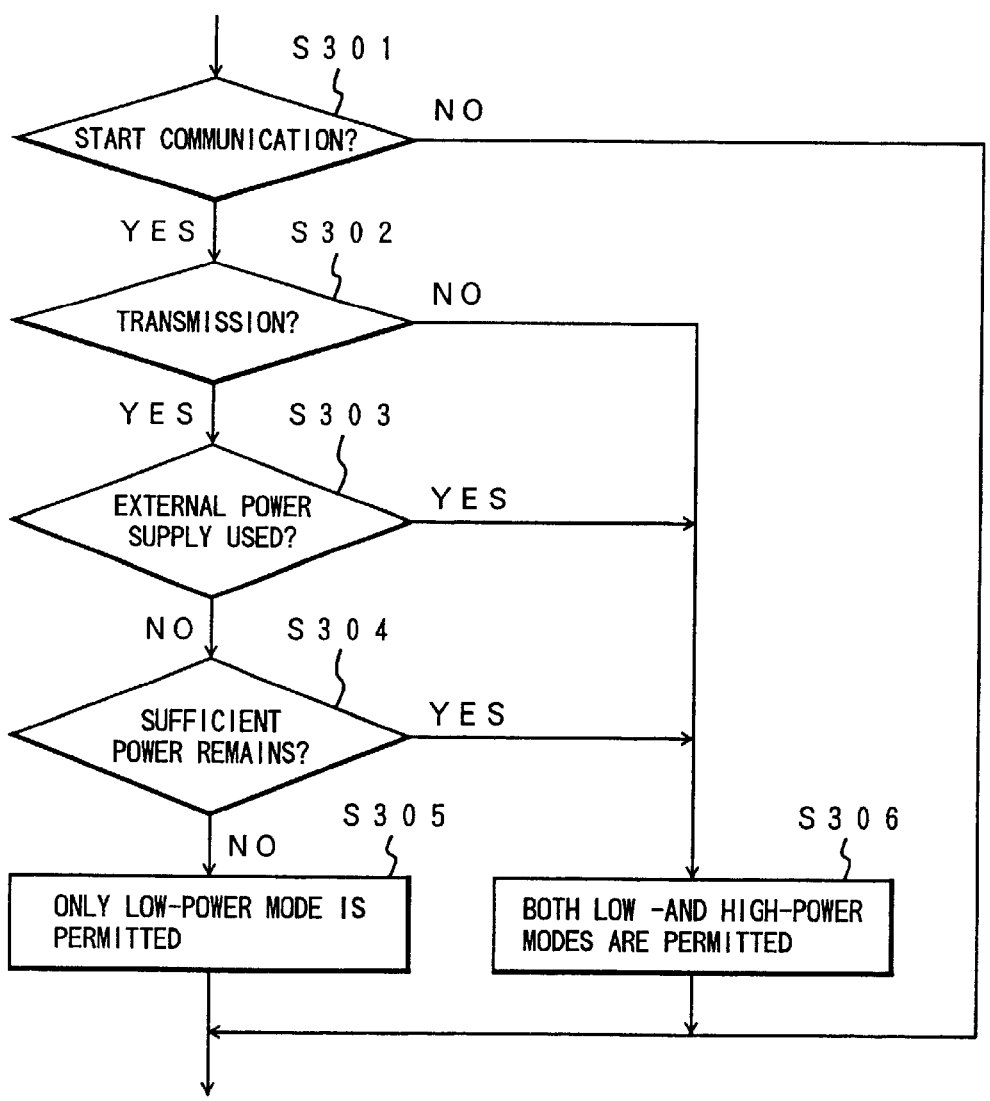

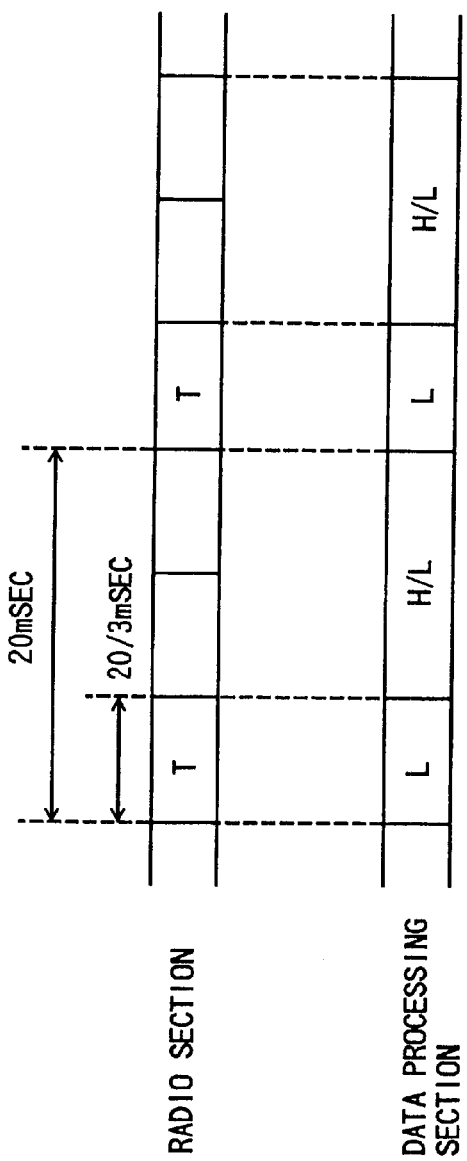

TRANSMISSION POWER RESTRICTION

BACKGROUND OF THE INVENTION

1. Field of the Invention

The present invention relates to a mobile information apparatus having a radio communication function and, more specifically, to a control method for a data processing section of the mobile information processing apparatus.

2. Description of the Related Art

There has been known mobile information gear which is a combination of an information processing section and a radio communication section. A mobile telephone such as PHS (personal handyphone system) or PDC (personal digital cellular) telephone may be used as the radio communication section to transmit and receive data in TDMA (time division multiple access) communications scheme. During communicating, the radio communication section alternately performs receiving and transmitting operations in frames.

On the other hand, it is desired that the power consumption of a battery-powered apparatus is as low as possible. To achieve the reduced power consumption, a microprocessor operates according to a selected clock frequency depending on a process to be performed because the power consumption increases with the clock frequency.

However, the frame timings of receiving and transmitting operations are not synchronized with the clock change timing of the microprocessor. Therefore, the capacity of a power supply circuit including the battery is designed to cope with the sum of maximum power consumption of the information processing section and the radio communication section. This causes the power supply circuit and the battery to increase in size and weight and thereby the mobile information terminal is prevented from miniaturization.

SUMMARY OF THE INVENTION

An object of the present invention is to provide a mobile information apparatus and a control method therefor which can achieve reduction of power consumption and miniaturization of the mobile information apparatus.

According to the invention, in a combination of an information processing section and a radio communication section, it is checked whether the radio communication section performs radio transmission in a predetermined communication scheme and, when the radio communication section performs the radio transmission, power consumption of the information processing section is restricted within a predetermined level lower than a normal level.

Since the power consumption of the information processing section is restricted within the lower level in the case of transmission, the total power consumption of the information processing section and the radio communication section is also restricted within a power consumption level lower than the maximum power consumption thereof. Therefore, the capacity of a power supply circuit is designed to cope with the sum of maximum power consumption of the radio communication section and the lower power consumption of the information processing section. This causes the power supply circuit and the battery to decrease in size and weight compared with the prior art, resulting in miniaturized mobile information apparatus.

BRIEF DESCRIPTION OF THE DRAWINGS

FIG. 2A is a time chart showing a communication operation of a radio section in a first embodiment of a control method according to the present invention;

FIG. 2B is a time chart showing an operation of a data processing section in the first embodiment;

FIG. 2C is a waveform diagram showing a change of current drain of the radio section in the first embodiment;

FIG. 2D is a waveform diagram showing a change of current drain of the data processing section in the first embodiment;

FIG. 2E is a waveform diagram showing a change of total current drain in the first embodiment;

FIG. 3 is a flow chart showing a control operation of the data processing section in a second embodiment of a control method according to the present invention;

FIG. 4A is a diagram showing another example of signal format usable in the embodiment of FIG. 1; and FIG. 4B is a diagram showing another control operation of the data processing section corresponding to the signal of FIG. 4A.

DESCRIPTION OF THE PREFERRED EMBODIMENTS

Figure 1:
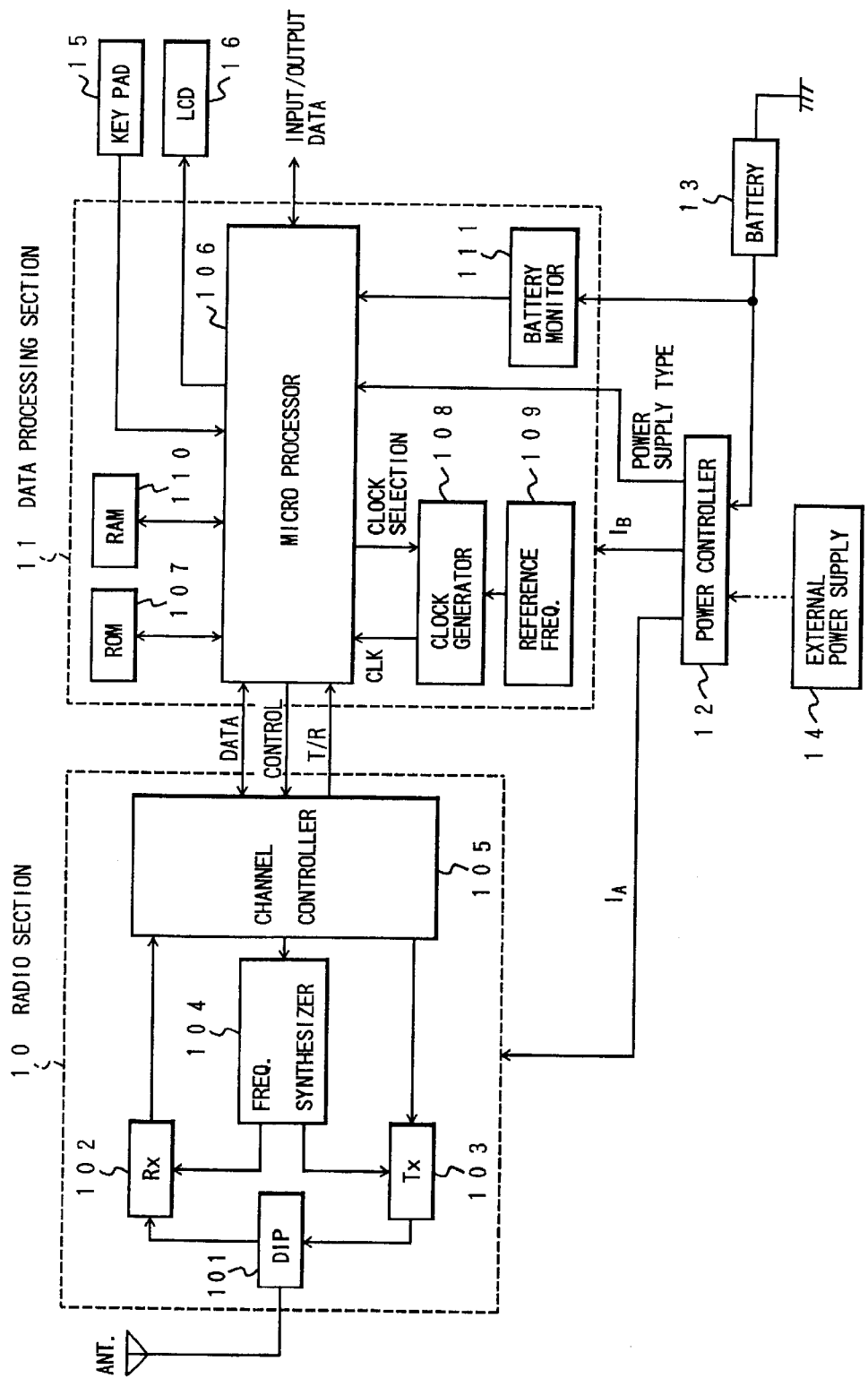
FIG. 1 is a block diagram showing a mobile information apparatus having a radio section according to an embodiment of the present invention.

Referring to FIG. 1, a mobile information apparatus includes a radio section 10. a data processing section 11 and a power controller 12. An electronic notebook or an electronic board having a TDMA radio communication function is an example of the mobile information apparatus. An internal battery 13 is provided in the mobile information apparatus and further an external power supply 14 such as a battery or AC adapter can be connected to the power controller 12. The mobile information apparatus is powered either through the internal battery 13 or through the external power supply 14.

In the case where the external power supply 14 is not connected, the power controller 12 selects the internal battery 13 and supplies power to the radio section 10 and the data processing section 11. When the external power supply 14 is connected, the power controller 12 selects the external power supply 14 from which the power is supplied. Hereinafter, the current supplied to the radio section 10 is denoted by $I_A$ and the current supplied to the data processing section 11 is denoted by $I_B$. Further, the power controller 12 informs the data processing section 11 of the type of a selected power supply.

The mobile information apparatus is further comprised of an input device 15 such as a keypad and a display 16 such as liquid crystal display (LCD). In the case of a mobile telephone, a speech processor, a speaker and a microphone are connected to the data processing section 11, which are not shown in this figure.

In the radio section 10, an antenna is connected to a diplexer 101 which is a passive device and connects the antenna to a receiver 102 and a transmitter 103. A frequency synthesizer 104 supplies local oscillation signals having controlled frequencies to the receiver 102 and the transmitter 103, respectively.

The receiver 102 receives a radio signal from a radio base station (not shown) through the antenna and demodulates the received radio signal into a baseband signal. The baseband signal is transferred from the receiver 102 to a channel controller 105. In the case of transmission, the channel controller 105 outputs a transmission signal to the transmitter 103 which modulates a carrier wave according to the transmission signal to produce a radio transmission signal.

The radio transmission signal is transmitted through the diplexer 101 and the antenna.

The channel controller 105 performs TDMA timing controls of the receiver 102 and the transmitter 103, respectively. Further the channel controller 105 performs TDMA timing control and frequency control of the frequency synthesizer 104.

The data processing section 11 includes a microprocessor 106 which controls the operations of the mobile information apparatus according to a program stored in a read-only memory (ROM) 107, as described later. The microprocessor 106 inputs received data from the channel controller 105 and outputs transmission data to the channel controller 105. The microprocessor 106 controls the channel controller 105 and receives a communication state, T/R (transmitting or receiving), of the radio section 10 from the channel controller 105.

The microprocessor 106 operates on a selected-frequency clock CLK which is generated by a clock generator 108 according to a clock selection signal. More specifically, the clock CLK is selected from a plurality of frequencies (here, 10 MHz, 40 MHz and 100 MHz). A reference frequency generator 109 supplies the clock generator 108 with a reference frequency.

The microprocessor 106 uses a random access memory (RAM) 110 to store necessary data. A battery monitor 111 is used to monitor the remaining quantity of power in the internal battery 13. For example, the battery monitor 111 may detect the output voltage of the internal battery 13. In this case, the microprocessor 106 compares the detected voltage of the internal battery 13 with a predetermined threshold value and. if the detected voltage is lower than the predetermined threshold value, it is determined that sufficient power does not remain in the internal battery 13.

As will be described later, the microprocessor 106 selects a clock frequency depending on the communication state of the radio section 10. In the case of transmission, the transmitter 103 consumes a relatively large amount of power. Therefore, during transmission, the microprocessor 106 controls the clock generator 108 so that the total current drain of the apparatus is restricted to less than a predetermined maximum level by selecting a lower-frequency clock. The details will be described hereinafter.

FIRST EMBODIMENT

Referring to FIG. 2A, it is assumed that the radio section 10 alternately performs the receiving and transmitting operations (R/T) in frames. Since the microprocessor 106 receives a communication state T/R from the channel controller 105, the microprocessor 106 switches between a low-power mode (L) and a normal mode (H/L) depending on the communication state T/R.

Referring to FIGS. 2C–2E, more specifically, since the current drain $I_A$ of the radio section 10 increases to the maximum level $I_{Amax}$ during the transmitting state T as shown in FIG. 2C, the clock supplied to the microprocessor 106 is fixed to a low frequency (for example, 10 MHz) so that the current drain $I_B$ of the data processing section 11 drops to the minimum level $I_{Bmin}$ as shown in FIG. 2D. That is, the microprocessor 106 is set to the low-power mode during the transmitting state T.

On the other hand, during the receiving state R, the current drain $I_A$ of the radio section 10 decreases to the minimum level $I_{Amin}$ as shown in FIG. 2C. Therefore, the frequency restriction of the microprocessor 106 is released so that a desired clock frequency is selected from the low frequency and a high frequency (for example, 100 MHz) depending on the program running on the microprocessor 106. The current drain $I_B$ of the data processing section 11 changes between the minimum level $I_{Bmin}$ and the maximum level $I_{Bmax}$ as shown in FIG. 2D. That is, the microprocessor 106 is set to the normal mode during the receiving state R.

Referring to FIG. 2E, the total current drain $I_C$ is the sum of the current drains $I_A$ and $I_B$, corresponding to power consumption of the battery 13. Since the current drain $I_B$ of the data processing section 11 drops to the minimum level $I_{Bmin}$ during the transmitting state T as shown in FIG. 2D, the total current drain $I_C$ is restricted to the maximum current drain $I_{Cmax}$. During the receiving state R, the total current drain $I_C$ changes between the minimum level $I_{Cmin}$ and the intermediate level $I_{Co}$.

Assuming that the current drain $I_A$ of the radio section 10 when transmitting is $I_{Amax}$=1000 mA, the current drain $I_A$ of the radio section 10 when receiving is $I_{Amin}$=10 mA, the current drain $I_B$ of the data processing section 11 at a high frequency of 100 MHz is $I_{Bmax}$=500 mA, and the current drain $I_B$ of the data processing section 11 at a low frequency of 10 MHz is $I_{Bmin}$=200 mA. Therefore, the total current drain $I_C$ is restricted to the maximum current drain $I_{Cmax}$=1200 mA during the transmitting state. When the microprocessor 106 operates on the high-frequency clock (100 MHz) during the receiving state, the total current drain $I_C$ is restricted to the intermediate current drain $I_{Co}$=510 mA. In the case where the microprocessor 106 operates on the low-frequency clock (10 MHz) during the receiving state, the total current drain $I_C$ is restricted to the minimum current drain $I_{Cmin}$=210 mA.

If the current drain $I_B$ of the data processing section 11 does not drop to the minimum level $I_{Bmin}$ during the transmitting state T as in the prior art, the total current drain $I_C$ may rise the maximum current drain $I_{Cmax}$=$I_{Amax}$+$I_{Bmax}$ to 1500 mA during the transmitting state. Therefore, compared with the prior art case, the maximum current drain is lower by 300 mA, resulting in enhanced miniaturization.

SECOND EMBODIMENT

Referring to FIG. 3, there is shown a power control of the microprocessor 106 according to a second embodiment of the present invention. In this embodiment, the selected power supply type and the monitored battery voltage are used to determine which clock frequency is to be selected.

As shown in FIG. 3, after starting the communication operation (YES in step S301), the microprocessor 106 checks whether the radio section 10 is in the transmitting state by monitoring the communication state signal received from the channel controller 105 (step S302).

When the radio section 10 is in the transmitting state T (YES in step S302), it is further checked whether the external power supply 14 is selected (step S303). If the external power supply 14 is not connected to the power controller 12 (NO in step S303), it is furthermore checked whether sufficient power remains in the battery 13 (step S304). When there is not enough power in the battery 13 (NO in step S304). only the low-power mode is permitted (step S305). When in the receiving state (NO in step S302), when the external power supply 14 is used (YES in step S303), or when there is enough battery power (YES in step S304), the normal mode is permitted (step S306).

In other words, according to the second embodiment, only when there is not enough power in the battery 13, the microprocessor 106 is set to the low-power mode, that is, controls the clock generator 108 so as to select the low-frequency clock. If sufficient power remains in the battery 13 or the external power supply 14 is used, a desired frequency clock is selected depending on the running program. Accordingly, an adequate processing speed can be obtained depending on the state of a power supply.

According to the first embodiment as shown in FIGS. 2A–2E, the microprocessor 106 is set to the low-power mode even when sufficient power remains in the battery. Needless to say, the first embodiment may be modified such that only when there is not enough power in the battery 13, the microprocessor 106 is set to the low-power mode.

Referring to FIGS. 4A and 4B, the mobile information apparatus according to the present invention may be applied to the PDC telephone system conforming to RCR-STD (Research and Development Center for Radio System Standard)-27. In this system, a single transmitting frame of 20 msec is followed by two receiving frames each of 20 msec. As described above, during the transmitting frame, the microprocessor 106 is set to the low-power mode (L). During the receiving frames, the microprocessor 106 is set to the normal mode (H/L).

Since the receiving frame of the signal scheme as shown in FIG. 4A is longer than the transmitting frame, the power consumption required for transmission is relatively low, resulting in reduced total power consumption. Therefore, the microprocessor 106 can operate on a higher-frequency clock.

What is claimed is:

1. In a combination of an information processing section and a radio communication section, a control method comprising the steps of:

a) checking and determining whether the radio communication section performs radio transmission in a predetermined communication scheme;

b) restricting power consumption of the information processing section within a predetermined level upon determining when the radio communication section performs the radio transmission; and c) releasing power consumption restriction upon determining when the radio communication section switches from radio transmission to radio reception.

2. The control method according to claim 1, wherein a battery supplies power to the information processing section and the radio communication section, the step b) comprising the steps of:

monitoring a remaining quantity of the battery; and restricting the power consumption of the information processing section within the predetermined level when the radio communication section performs the radio transmission and the remaining quantity of the battery is smaller than a predetermined threshold level.

3. The control method according to claim 2, further comprising the steps of:

c) releasing power consumption restriction when the radio communication section performs radio reception; and d) releasing the power consumption restriction when the remaining quantity of the battery is not smaller than the predetermined threshold level.

4. The control method according to claim 1, wherein a selected one of an internal battery and an external power supply supplies power to the information processing section and the radio communication section, the step b) comprising the steps of:

monitoring a remaining quantity of the battery;

checking whether the external power supply is selected; and restricting the power consumption of the information processing section within the predetermined level when the radio communication section performs the radio transmission, when the external power supply is not selected, and when the remaining quantity of the battery is smaller than a predetermined threshold level.

5. The control method according to claim 4, further comprising the steps of:

c) releasing power consumption restriction when the radio communication section performs radio reception;

d) releasing the power consumption restriction when the external power supply is selected; and e) releasing the power consumption restriction when the remaining quantity of the battery is not smaller than the predetermined threshold level.

6. The control method according to claim 1, wherein in the step b), the predetermined level is selected from a plurality of power consumption levels lower than the normal level.

7. The control method according to claim 6, wherein the predetermined level is a minimum level of the plurality of power consumption levels.

8. The control method according to claim 6, wherein the information processing section includes a microprocessor, the step b) comprising the step of:

selecting a relatively low clock frequency from a plurality of clock frequencies; and supplying the relatively low clock frequency to the microprocessor.

9. A mobile information apparatus comprising:

a radio transceiver for receiving and transmitting radio signals in a predetermined communication scheme;

a processor for processing information which is received and transmitted through the radio transceiver; and an adjuster for adjusting current drain of the processor in synchronization with the predetermined communication scheme such that upon determining when the radio transceiver transmits a radio signal, the current drain of the processor is restricted within a predetermined level, wherein the adjuster releases current drain restriction upon determining when the radio transceiver stops radio transmission and receives a radio signal.

10. The mobile information apparatus according to claim 9, further comprising:

a battery for supplying power to the processor and the radio transceiver; and a battery monitor for monitoring a remaining quantity of the battery, wherein the adjuster restricts the current drain of the processor within the predetermined level when the radio transceiver transmits a radio signal and the remaining quantity of the battery is smaller than a predetermined threshold level.

11. The mobile information apparatus according to claim 10, wherein the adjuster releases current drain restriction when the remaining quantity of the battery is not smaller than the predetermined threshold level.

12. The mobile information apparatus according to claim 9, further comprising:

an internal battery for supplying power to the processor and the radio transceiver;

an external power supply for supplying power to the processor and the radio transceiver;

a power controller for selecting one of the internal battery and the external power supply and supplying power from a selected one to the processor and the radio transceiver; and a battery monitor for monitoring a remaining quantity of the battery, wherein the adjuster restricts the current drain of the processor within the predetermined level when the radio transceiver transmits a radio signal, when the external power supply is not selected, and when the remaining quantity of the battery is smaller than a predetermined threshold level.

13. The mobile information apparatus according to claim 12, wherein the adjuster releases current drain restriction when the external power supply is selected.

14. The mobile information apparatus according to claim 12, wherein the adjuster releases current drain restriction when the remaining quantity of the battery is not smaller than the predetermined threshold level.

15. The mobile information apparatus according to claim 9, further comprising:

a current drain selector for selecting the predetermined level from a plurality of current drain levels lower than the normal level.

16. The mobile information apparatus according to claim 15, wherein the predetermined level is a minimum level of the plurality of current drain levels.

17. The mobile information apparatus according to claim 15, wherein the current drain selector selects a relatively low clock frequency from a plurality of clock frequencies to supply the relatively low clock frequency to the processor.

18. The mobile information apparatus according to claim 9, wherein the predetermined communication scheme is TDMA (Time Division Multiple Access) scheme and the radio transceiver transmits a radio signal in a transmission frame.

19. A mobile information apparatus comprising:

a radio transceiver for receiving and transmitting radio signals in a predetermined communication scheme;

a processor for processing information which is received and transmitted through the radio transceiver;

an adjuster for adjusting current drain of the processor to be restricted within a predetermined positive level, a battery for supplying power to the processor and the radio transceiver; and a battery monitor for monitoring a remaining voltage of the battery, wherein the adjuster restricts the current drain of the processor within the predetermined positive level upon determining when the radio transceiver transmits a radio signal and the remaining voltage of the battery is smaller than a predetermined threshold positive level, for operating said processor at a reduced power level and the adjuster releases the current drain restriction upon determining when the radio receiver receives a radio signal.

* * * * *